(12) United States Patent
Edvardsson et al.

(10) Patent No.: US 9,518,858 B2
(45) Date of Patent: Dec. 13, 2016

(54) GUIDED WAVE RADAR LEVEL GAUGE SYSTEM WITH REDUCED END OF PROBE REFLECTION

(71) Applicant: Rosemount Tank Radar AB, Gothenburg (SE)

(72) Inventors: Olov Edvardsson, Linkoping (SE); Michael Larsson, Gothenburg (SE)

(73) Assignee: ROSEMOUNT TANK RADAR AB, Gothenburg (SE)

( * ) Notice: Subject to any disclaimer, the term of this patent is extended or adjusted under 35 U.S.C. 154(b) by 262 days.

(21) Appl. No.: 14/513,538

(22) Filed: Oct. 14, 2014

(65) Prior Publication Data
US 2016/0103008 A1 Apr. 14, 2016

(51) Int. Cl.
*G01F 23/284* (2006.01)
*G01S 7/02* (2006.01)
*G01S 13/88* (2006.01)

(52) U.S. Cl.
CPC ............. *G01F 23/284* (2013.01); *G01S 7/02* (2013.01); *G01S 13/88* (2013.01)

(58) Field of Classification Search
CPC ........... G01F 23/284; G01S 13/88; G01S 7/02
USPC ......................................... 342/124; 73/290 R
See application file for complete search history.

(56) References Cited

U.S. PATENT DOCUMENTS

| 7,334,451 | B1* | 2/2008 | Fauveau | G01F 23/284 73/1.73 |
| 7,525,476 | B1  | 4/2009 | Delin et al. | |
| 7,586,435 | B1* | 9/2009 | Edvardsson | G01F 23/284 324/600 |
| 7,741,993 | B1* | 6/2010 | Airhart | G01S 7/03 342/124 |

(Continued)

FOREIGN PATENT DOCUMENTS

| EP | 2 490 040 | 8/2012 |
| EP | 2 884 245 | 6/2015 |
| WO | WO 2014/052577 | 4/2014 |

OTHER PUBLICATIONS

European Extended Search Report from EP Application No. 15186082.2, dated Apr. 15, 2016.

(Continued)

*Primary Examiner* — John B Sotomayor
(74) *Attorney, Agent, or Firm* — Westman, Champlin & Koehler, P.A.

(57) ABSTRACT

The present invention relates to a guided wave radar level gauge system comprising a transceiver for generating an electromagnetic transmit signal within a predetermined frequency range having a center frequency, a flexible single conductor probe having a first end connected to the transceiver and extending towards and into the product to a second end of the flexible single conductor probe; and a probe aligning member attached to the second end of the flexible single conductor probe for keeping the flexible single conductor probe substantially vertically extending (Continued)

from the first end to the second end. The probe aligning member exhibits a horizontal extension that increases with increasing distance from the first end of the flexible single conductor probe along a vertical distance greater than one half of a wavelength of the transmit signal at the center frequency. Hereby, determination of filling levels close to the bottom of the tank is improved.

11 Claims, 7 Drawing Sheets

(56) References Cited

U.S. PATENT DOCUMENTS

| | | | | |
|---|---|---|---|---|
| 2007/0205781 | A1* | 9/2007 | Eriksson | G01F 23/284 342/124 |
| 2012/0242532 | A1* | 9/2012 | Fouarge | B01J 8/0015 342/124 |
| 2014/0104098 | A1* | 4/2014 | Linden | G01F 23/284 342/124 |
| 2014/0125512 | A1* | 5/2014 | Janitch | G01F 23/284 342/124 |
| 2014/0159944 | A1* | 6/2014 | Fredriksson | G01F 23/284 342/124 |
| 2014/0266864 | A1* | 9/2014 | Fredriksson | G01F 23/284 342/124 |
| 2014/0326038 | A1* | 11/2014 | Fauveau | G01F 25/0061 73/1.73 |
| 2015/0084809 | A1* | 3/2015 | Flasza | G01F 23/284 342/124 |
| 2015/0168203 | A1 | 6/2015 | Haas et al. | |
| 2015/0177044 | A1* | 6/2015 | Edvardsson | G01F 23/284 342/124 |
| 2015/0276458 | A1* | 10/2015 | Cobianu | G01F 23/284 342/124 |
| 2016/0091357 | A1* | 3/2016 | Hedtke | G01F 23/284 342/124 |
| 2016/0103007 | A1* | 4/2016 | Fredriksson | G01S 7/02 342/124 |
| 2016/0103008 | A1* | 4/2016 | Edvardsson | G01S 13/88 342/124 |
| 2016/0153820 | A1* | 6/2016 | Heath | G01S 7/28 342/124 |

OTHER PUBLICATIONS

Downloaded 2012 CAD Drawing from https://www.vega.com/ DocumentDownloadHandler.ashx? documentContainerId=1001609 &languageId=1&fileExtension=pdf&softwareVersion= &documentGroupId=MB5112, Vega Grieshaber KG.

* cited by examiner

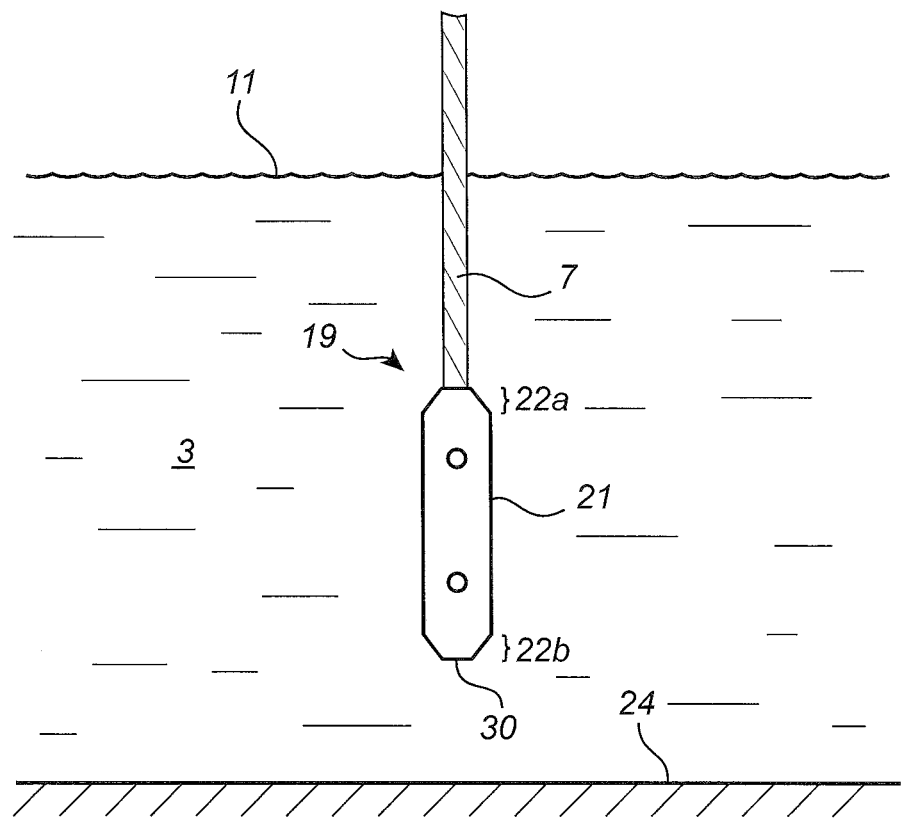
(Prior art) Fig. 2
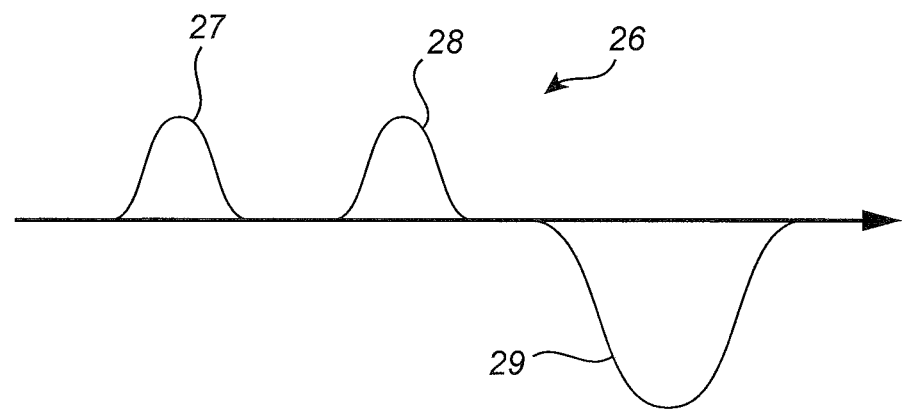
(Prior art) Fig. 3

GUIDED WAVE RADAR LEVEL GAUGE SYSTEM WITH REDUCED END OF PROBE REFLECTION

TECHNICAL FIELD OF THE INVENTION

The present invention relates to a guided wave radar level gauge system comprising a single conductor probe and a probe aligning member for keeping the flexible single conductor probe substantially vertically aligned.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a transmission line probe acting as a waveguide. The probe is generally arranged to extend vertically from the top towards the bottom of the tank. In the case of the probe being a flexible single conductor probe, the probe may be kept substantially vertical by means of a weight attached to the bottom end of the flexible single conductor probe.

An electromagnetic transmit signal is generated by a transceiver and propagated by the probe towards the surface of the product in the tank, and an electromagnetic reflection signal resulting from reflection of the transmit signal at the surface is propagated back towards to the transceiver.

Based on the transmit signal and the reflection signal, the distance to the surface of the product can be determined.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the variation of the phase difference between a transmitted swept (frequency-modulated) signal and its reflection at the surface. The latter type of system is generally referred to as being of the FMCW (Frequency Modulated Continuous Wave) type. The pulsed systems commonly used for GWR use a train of short DC pulses (~1 ns) processed in a way called TDR (Time Domain Reflectometry).

In any case, the transmit signal is typically not only reflected at the impedance transition constituted by the interface between the tank atmosphere and the surface of the product, but at several other impedance transitions encountered by the transmit signal. In the case of a GWR-system, one such impedance transition typically occurs at the connection between the transceiver and the probe and another such impedance transition occurs at the bottom end of the probe. The impedance transition at the bottom end of the probe may make it difficult to accurately determine filling levels close to the bottom end of the probe.

SUMMARY OF THE INVENTION

In view of the above, a general object of the present invention is to provide for an improved guided wave radar level gauge system, in particular a guided wave radar level gauge system providing for improved filling level determination close to a bottom end of the probe comprised in the guided wave radar level gauge system.

According to the present invention, it is therefore provided a guided wave radar level gauge system, for determining a filling level of a product contained in a tank, the guided wave radar level gauge system comprising: a transceiver for generating, transmitting and receiving electromagnetic signals within a predetermined frequency range having a center frequency; a flexible single conductor probe having a first end connected to the transceiver and extending towards and into the product to a second end of the flexible single conductor probe for guiding an electromagnetic transmit signal from the transceiver through a tank atmosphere towards a surface of the product, and for returning an electromagnetic surface reflection signal resulting from reflection of the transmit signal at the surface back towards the transceiver; a probe aligning member attached to the second end of the flexible single conductor probe for keeping the flexible single conductor probe substantially vertically extending from the first end to the second end, the probe aligning member exhibiting a horizontal extension that increases with increasing distance from the first end of the flexible single conductor probe along a vertical distance greater than one half of a wavelength of the transmit signal at the center frequency; and processing circuitry connected to the transceiver for determining the filling level based on the transmit signal and the surface reflection signal.

The tank may be any container or vessel capable of containing a product.

The "transceiver" may be one functional unit capable of transmitting and receiving electromagnetic signals, or may be a system comprising separate transmitter and receiver units.

The flexible single conductor probe may comprise a wire or cable, and may be substantially pliable.

The present invention is based on the realization that the range of filling levels that can be accurately measured, using a guided wave radar level gauge system with a flexible single conductor probe with a probe aligning member for keeping the flexible single conductor probe substantially straight and vertical, can be increased by shaping the probe aligning member to provide a gradual impedance transition from the impedance of the probe to the impedance of the probe aligning member (below the shaped portion of the probe aligning member, or at the end of the shaped portion).

Furthermore, the present inventors have realized that this can be achieved by structuring the electrically conductive probe aligning member such that it exhibits a horizontal extension that increases with increasing distance from the first end of the flexible probe along a distance greater than one half of a center wavelength of the transmit signal.

This will provide for a smooth impedance transition when the probe aligning member is above the surface of the product as well as when the probe aligning member is submerged in a product with a dielectric constant of about 2.25 or less (such as oil). As a consequence, the reflection signal (echo) at the interface between the probe and the probe aligning member will be negligible as compared to currently used probe aligning members (a substantially cylindrical weight), which in turn means that filling levels close to the interface between the probe and the probe alignment member can be measured more accurately.

It should be noted that the above-mentioned vertical distance is specified to be greater than one half of a wavelength of the transmit signal at the center frequency of the transmit signal. The commonly used TDR systems use the frequency range abound 0.1-1 GHz in the middle of which half a wavelength is 30 cm. A bit higher frequencies may be used in future GWR-systems, decreasing said length (one half of the center wavelength) to 10-15 cm, but with higher frequencies the losses along a GWR-wire will increase too.

Existing probe aligning members (substantially cylindrical weights), on the other hand, sometimes exhibit an increasing horizontal extension (a frustoconical portion) along a vertical distance of around 1 cm. The purpose of such a chamfer between the vertical envelope surface and the horizontal top surface of an existing substantially cylindrical weight is mainly cosmetic. Such a chamfer has practically no effect on the electrical properties of the probe aligning member for frequency ranges useable for guided wave radar level gauging.

To the inventors' knowledge, the problem of a relatively strong reflection signal resulting from reflection of the transmit signal at the interface between probe and probe aligning member has not previously been addressed, in particular not by configuring the probe aligning member to have a very long (in relation to existing probe aligning members/weights) portion with increasing horizontal extension.

It should be noted that the probe aligning member need not necessarily be rotationally symmetrical in respect of the vertical axis (when the probe aligning member is installed in a tank). For instance, a cross-section of the probe aligning member may have a major axis and a minor axis. In embodiments, the probe aligning member may even be substantially planar, for example made of sheet metal. In such embodiments, where the probe aligning member exhibits, for each vertical position, a maximum horizontal extension, it is this maximum horizontal extension that increases with increasing distance from the first end of the flexible single conductor probe.

To provide for the desired smooth impedance transition, while still allowing easy insertion into most existing suitable openings through the roof of a tank, the horizontal extension of the probe aligning member may increase from a first horizontal extension substantially corresponding to a diameter of the flexible single conductor probe to a second horizontal extension being less than or equal to 5 cm. Even more advantageously, the second horizontal extension may be less than, say, 3 cm.

According to various embodiments of the guided wave radar level gauge system of the present invention, the probe aligning member may advantageously have a mass being greater than half a total mass of the flexible single conductor probe. Hereby, the flexible single conductor probe can be kept stretched (substantially straight) and substantially vertical. Even more advantageously, from the perspective of stretching and aligning the flexible single conductor probe, the probe aligning member may have a mass being greater than the total mass of the flexible single conductor probe.

Furthermore, to achieve the desired smooth impedance transition along a relatively short vertical distance, the horizontal extension may advantageously increase exponentially with increasing distance from the first end of the flexible single conductor probe.

According to various embodiments, the probe aligning member may advantageously comprise a substantially conical portion. For a desired relation between maximum horizontal extension and length (vertical extension) of the probe aligning member, a conical portion will provide the largest mass per unit length. Hence, configurations of the probe aligning member with a substantially conical portion will be able to provide a desired combination of a smooth impedance transition and easy insertion through existing holes (relatively small diameter/maximum horizontal extension) at a shorter total length of the probe aligning member than other configurations of the probe aligning member.

To further optimize the probe aligning member in the trade off between electrical performance, easy insertion, sufficient mass and total length, the probe aligning member may advantageously comprise a substantially cylindrical portion below the substantially conical portion.

More generally, the probe aligning member may advantageously comprise: a first portion exhibiting the horizontal extension that increases with increasing distance from the first end of the flexible single conductor probe along a vertical distance greater than one half of a wavelength of the transmit signal at the center frequency; and a second portion, further away from the first end of the flexible single conductor probe than the first portion, exhibiting a substantially constant horizontal extension.

These embodiments, with a first portion with increasing horizontal extension and a second portion with a substantially constant horizontal extension, are based on the realization that it is relatively easy to get a sufficiently small reflection of the transmit signal at the interface between the first portion and the second portion. These embodiments provide for a favorable trade-off between a considerably reduced reflection at the probe aligning member and length (vertical extension) of the probe aligning member, while at the same time having a sufficient mass to keep the flexible probe straight and vertical and allowing insertion through most existing openings in tank roofs.

According to various embodiments, the probe aligning member may comprise a vertically extending bore accommodating a portion of the flexible single conductor probe.

According to other embodiments, the probe aligning member may comprise a conductive structure with first and second longitudinally extending substantially planar portions forming an angle with respect to each other, and at least one fixing structure pressing the flexible single conductor probe against the probe conductive structure inside the angle.

In these embodiments, the probe aligning member may be substantially shaped as an angle trim with increasing horizontal extension. For instance, the planar portions may be cut to provide the desired increasing horizontal extension. The at least one fixing structure may, for example, comprise a metal plate and at least one screw for pressing the flexible single conductor probe between the metal plate and the inner corner of the angle trim by screwing the at least one screw into a corresponding screw hole formed in the angle trim.

According to still further embodiments, the probe aligning member may comprise a plurality of flexible bars, each having a first bar end and a second bar end, the first bar end of each of the flexible bars being connected to the flexible single conductor probe, and each of the bars, in an expanded state of the probe aligning member, extending from the first bar end in a direction deviating from the vertical direction to provide a tapered probe aligning member, wherein at least one of the bars may be temporarily deflected to place the probe aligning member in a compressed state in which a maximum horizontal extension of the probe aligning member is reduced compared to the expanded state.

In summary, the present invention thus relates to a guided wave radar level gauge system comprising a transceiver for generating an electromagnetic transmit signal within a predetermined frequency range having a center frequency, a flexible single conductor probe having a first end connected to the transceiver and extending towards and into the product to a second end of the flexible single conductor probe;

and a probe aligning member attached to the second end of the flexible single conductor probe for keeping the flexible single conductor probe substantially vertically extending from the first end to the second end. The probe aligning member exhibits a horizontal extension that increases with increasing distance from the first end of the flexible single conductor probe along a vertical distance greater than one half of a wavelength of the transmit signal at the center frequency. Hereby, determination of filling levels close to the bottom of the tank is improved.

BRIEF DESCRIPTION OF THE DRAWINGS

These and other aspects of the present invention will now be described in more detail, with reference to the appended drawings showing an example embodiment of the invention, wherein:

FIG. 1b is a schematic illustration of the measurement electronics unit comprised in the radar level gauge system in FIG. 1a;

FIG. 2 schematically illustrates a probe aligning member according to the prior art;

FIG. 3 is schematically illustrates an exemplary echo profile obtained using the radar level gauge system in FIG. 1a with the probe aligning member in FIG. 2;

DETAILED DESCRIPTION OF AN EXAMPLE EMBODIMENT OF THE INVENTION

Figure 1A:
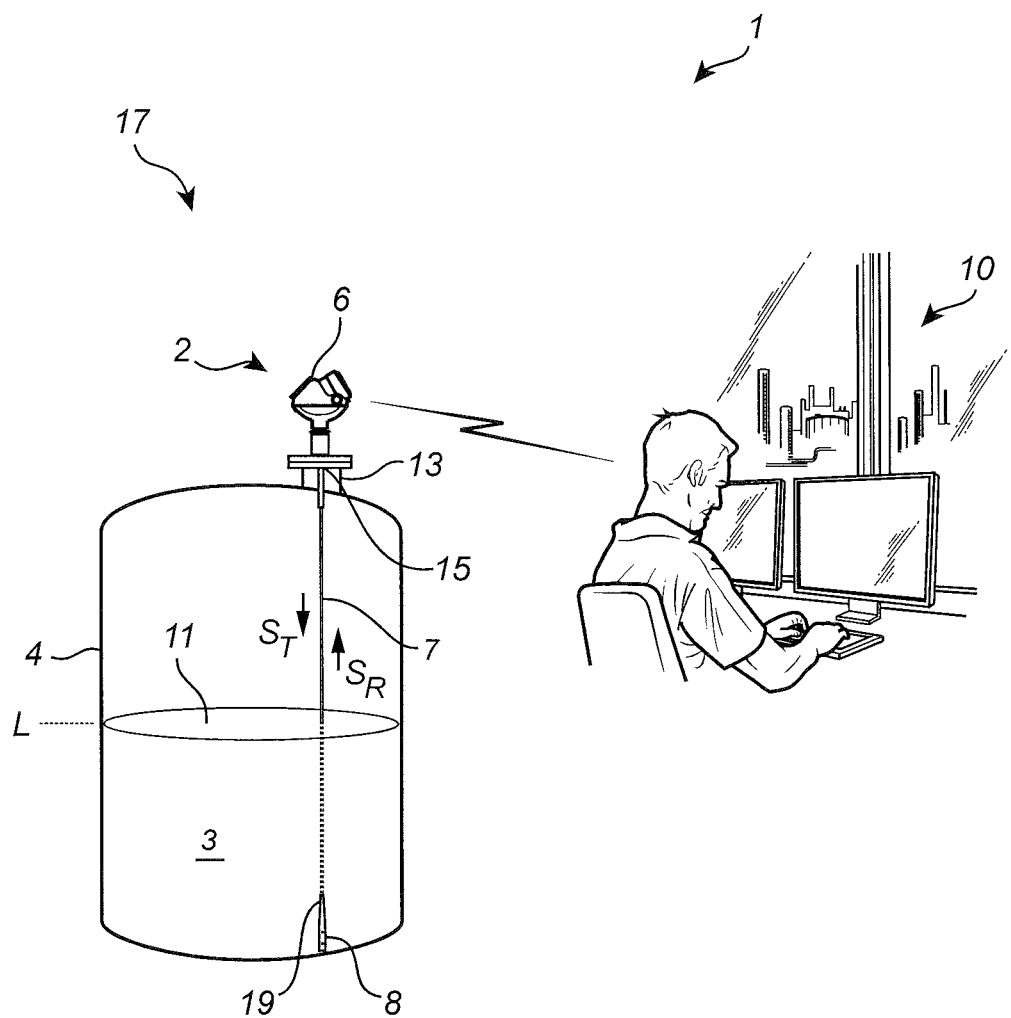
FIG. 1a schematically illustrates an exemplary tank arrangement comprising a radar level gauge system according to an embodiment of the present invention.

FIG. 1a schematically shows a level measuring system 1 comprising a tank arrangement 17, and a host system 10 illustrated as a control room.

The tank arrangement 17 comprises a radar level gauge 2 of GWR (Guided Wave Radar) type and a tank 4 having a tubular mounting structure 13 (often referred to as a "nozzle") extending substantially vertically from the roof of the tank 4.

The radar level gauge 2 is installed to measure the filling level of a product 3 contained in the tank 4. The radar level gauge 2 comprises a measuring unit 6 and a propagation device in the form of a single conductor probe 7 extending from the measuring unit 6, through the tubular mounting structure 13, towards and into the product 3. In the example embodiment in FIG. 1a, the single conductor probe 7 is a wire probe having a first end 18 connected to the measuring unit 6 and a second end 19 connected to a probe aligning member, in the form of a weight 8, to keep the wire straight and vertical. The probe aligning member 8 has a conical top portion and a cylindrical bottom portion, where the conical top portion has a length that corresponds to at least one half of the center wavelength of the transmit signal of the guided wave radar level gauge system. Various configurations of the probe aligning member 8 will be described further below.

By analyzing transmitted signals $S_T$ being guided by the probe 7 towards the surface 11 of the product 3, and reflected signals $S_R$ traveling back from the surface 11, the measurement unit 6 can determine the distance between a reference position (such as a feed-through between the outside and the inside of the tank) and the surface 11 of the product 3, whereby the filling level L can be deduced. It should be noted that, although a tank 4 containing a single product 3 is discussed herein, the distance to any material interface along the probe can be measured in a similar manner.

Figure 1B:
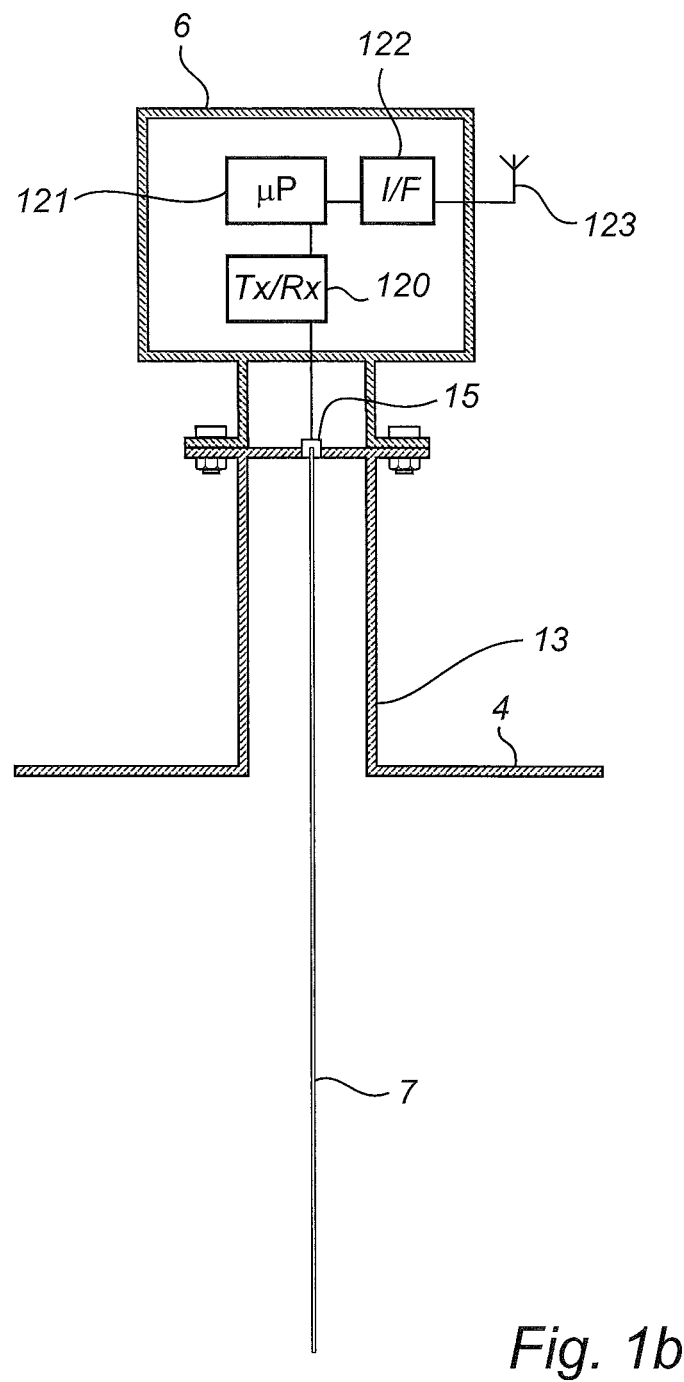

As is schematically illustrated in FIG. 1b, the measurement unit 6 comprises a transceiver 120, processing circuitry 121, a communication interface 122, and a communication antenna 123 for wireless communication with the control room 10.

The transceiver is configured to generate, transmit and receive electromagnetic signals, the processing circuitry is connected to the transceiver and configured to determine the filling level L of the product 3 based on a received electromagnetic reflection signal $S_R$ being a reflection of the transmit signal $S_T$ at the surface 11 of the product 3, and the communication interface is connected to the processing circuitry and configured to allow communication with the host system 10. In the example embodiment of FIG. 1a, the communication between the radar level gauge 2 and the host system 10 is indicated as being wireless communication. Alternatively, communication may, for example, take place over an analog and/or digital wire-based communication channel. For instance, the communication channel may be a two-wire 4-20 mA loop and the filling level may be communicated by providing a certain current corresponding to the filling level on the two-wire 4-20 mA loop. Digital data may also be sent across such a 4-20 mA loop, using the HART protocol. Furthermore, pure digital communication protocols such as Modbus or Foundation Fieldbus may be used.

In addition to above-mentioned surface reflection signal resulting from reflection of the transmit signal at the surface 11 of the product 3 in the tank 4, the transmit signal will be reflected at further impedance transitions encountered along the probe 7. For products that are at least partly transparent to the microwaves, such as oil, a portion of the transmit signal $S_T$ will be guided through the product 3 and be reflected at one or several impedance discontinuities (impedance steps) below the surface 11 of the product 3.

For filling levels high up in the tank, echo signals from impedance discontinuities far down in the tank can generally be ignored, but for filling levels close to the bottom of the tank, the filling level measurement may be disturbed by such impedance discontinuities.

For example, the present inventors have noticed that a conventional probe aligning member (bottom weight) may limit the possibility to measure low filling levels accurately. This will now be described with reference to FIG. 2 showing an example of a conventional probe aligning member and FIG. 3 schematically showing a portion of an exemplary echo curve for the configuration in FIG. 2.

FIG. 2 schematically shows an example of a conventional bottom weight 21 attached to the second end 19 of the flexible single conductor probe 7. As is schematically indicated in FIG. 2, the conventional bottom weight 21 has first 22a and second 22b chamfered portions, mainly for cosmetic reasons and for facilitating handling of the bottom weight 21. The vertical extension of each of the chamfered portions 22a-b may typically be around one cm. The bottom weight 21 is located close to the bottom 24 of the tank 4.

In FIG. 2, the surface 11 of the product 3 is indicated as being close to the bottom weight 21. For a product (such as oil) that is rather transparent to microwaves, a portion of the echo curve is schematically shown in FIG. 3. Referring to FIG. 3, the echo curve 26 comprises a first echo signal 27 resulting from reflection of the transmit signal at the surface 11 of the product 4, a second echo signal 28 resulting from reflection of the transmit signal at the impedance discontinuity at the interface between the probe 7 and the bottom weight 21, and a third echo signal 29 resulting from reflection of the transmit signal at the impedance discontinuity at the bottom surface 30 of the bottom weight 21.

All radar level gauge systems have limited capabilities to separate different echoes which are closer to each other than about 20 cm (a bit depending on radar parameters), so the cluster of echoes in FIG. 3 indicates decreased accuracy.

As is clear from the echo curve 26 in FIG. 3, the first echo signal 27 and the second echo signal are comparable in magnitude, and it can easily be understood that it will be difficult, or maybe even impossible, to accurately determine filling levels close to the conventional bottom weight 21.

Figure 4:
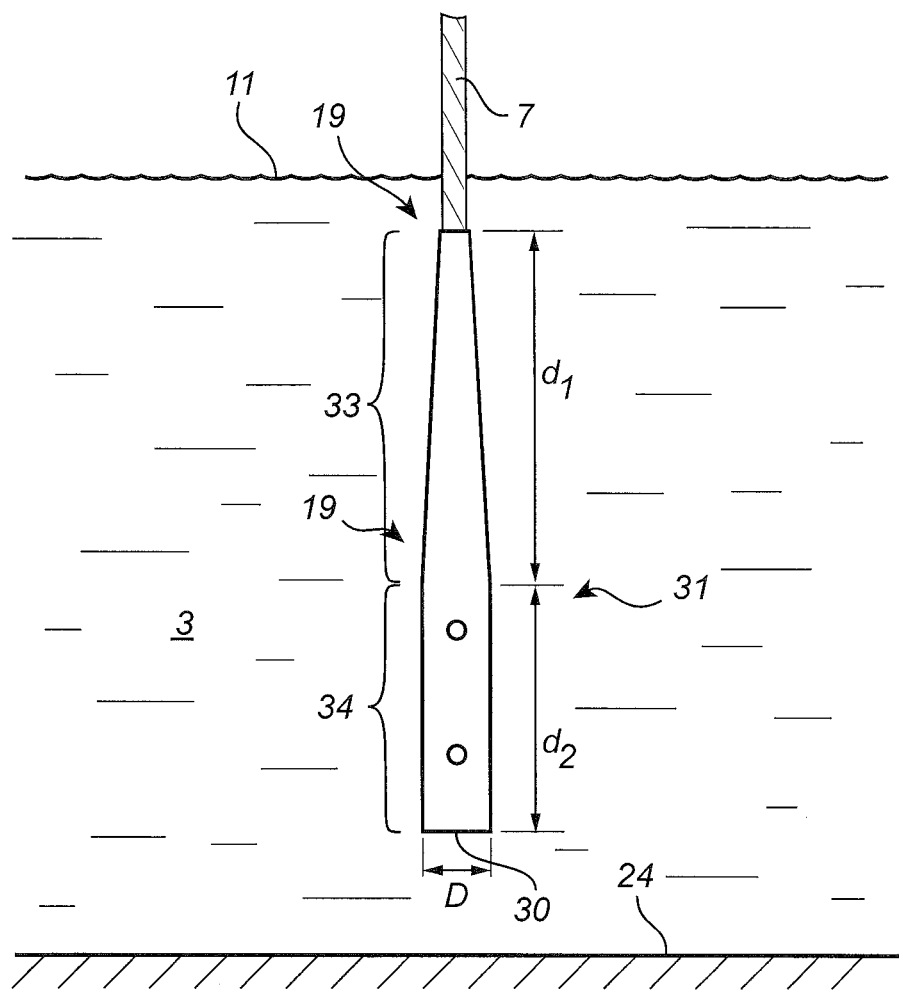
FIG. 4 schematically illustrates a probe aligning member comprised in a guided wave radar level gauge system according to a first embodiment of the present invention.
Figure 5:
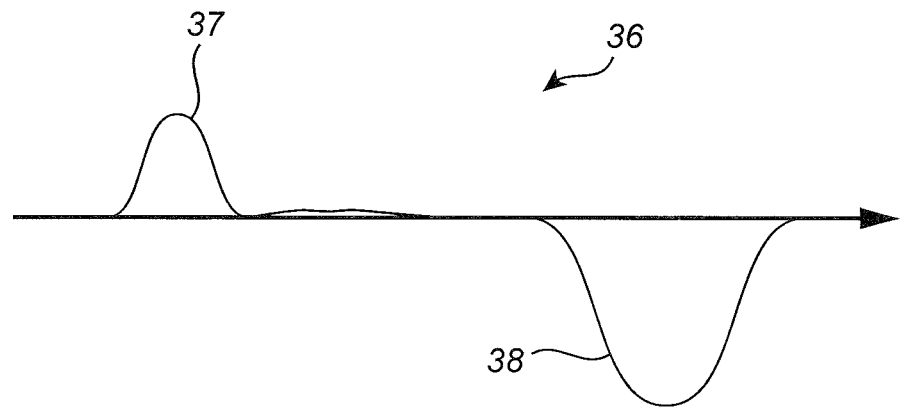
FIG. 5 is schematically illustrates an exemplary echo profile obtained using the radar level gauge system in FIG. 1a with the probe aligning member in FIG. 4.

FIG. 4 schematically shows a first configuration of a probe aligning member 31 comprised in a guided wave radar level gauge system according to an embodiment of the present invention, and FIG. 5 schematically shows a portion of an exemplary echo curve for the configuration in FIG. 4.

Referring to FIG. 4, the probe aligning member 31 has an upper, substantially conical portion 33, and a lower, substantially cylindrical portion 34. In the upper portion 33, the horizontal extension of the probe aligning member 31 increases exponentially with increasing distance from the first end of the probe 7 over a vertical distance $d_1$ of at least one half of the center wavelength (the wavelength at the center frequency) of the transmit signal $S_T$. For a conventional TDR (time domain reflectometry) radar level gauge systems, the vertical distance $d_1$ should be at least about 30 cm, and for guided wave radar level gauge systems with a pulsed modulated carrier with a bandwidth of about 1-2 GHz or an FMCW-type GWR with the same bandwidth, the vertical distance $d_1$ should be at least about 10 cm.

The length $d_2$ of the cylindrical portion 34 of the probe aligning member 31 in FIG. 4 is selected to be sufficient to straighten the wire probe 7 and keeping the probe 7 vertically aligned. For an exemplary case with a 6 mm diameter wire probe 7 that is about 10 m long, and an upper portion 33 of the probe aligning member 31 that is about 0.6 m long, the length of the cylindrical portion 34 of about 0.5 m may give the probe aligning member 31 (made of stainless steel) sufficient mass to straighten and vertically align the wire probe 7.

With a sufficiently long portion 33 of the probe aligning member 31 having a gradually increasing horizontal extension, the reflection of the transmit signal $S_T$ at the interface between probe 7 and probe aligning member 31 can be removed or at least considerably reduced. This is schematically illustrated in FIG. 5, showing an echo curve 36 comprising a first echo signal 37 resulting from reflection of the transmit signal at the surface 11 of the product 4, and a second echo signal 38 (corresponding to the third echo signal 29 in FIG. 3) resulting from reflection of the transmit signal at the impedance discontinuity at the interface between the probe 7 and the bottom weight 31. Compared to the echo curve 26 in FIG. 3, it is clear that the probe aligning member 31 in FIG. 4 allows filling level measurements closer to the bottom 24 of the tank than is possible with the conventional bottom weight 21 in FIG. 2.

A suitable dimensioning of the probe aligning member 31 in FIG. 4 will depend on various factors, including for example the frequency range of the transmit signal $S_T$, the dimensions of the wire probe 7, and the size of the available opening in the tank roof.

Figure 6:
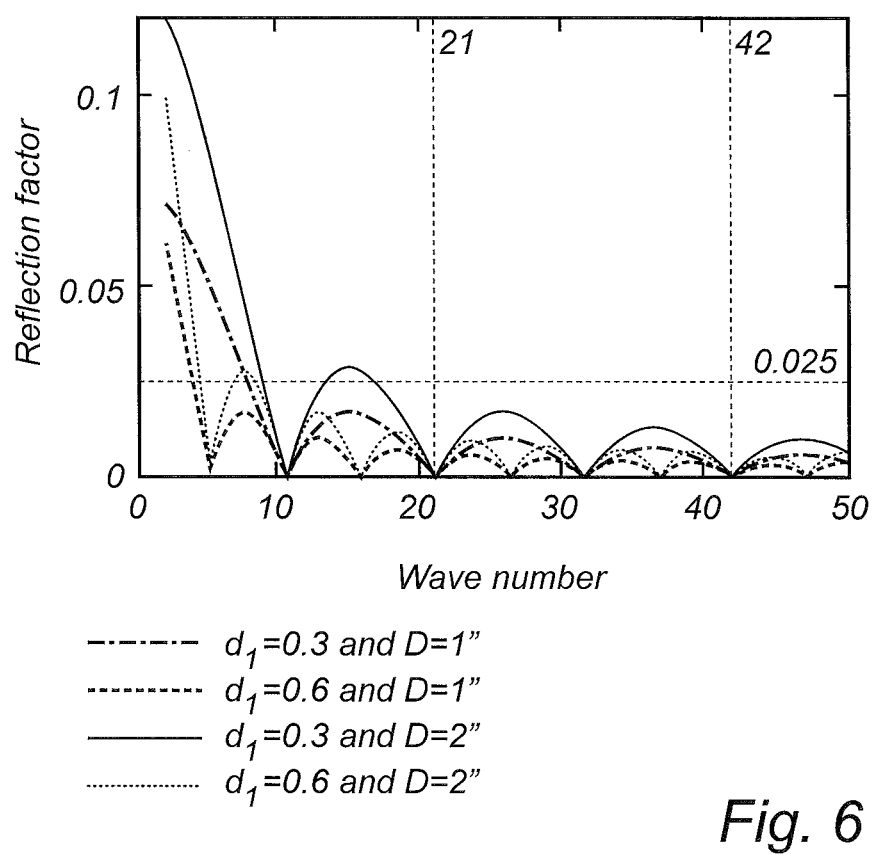
FIG. 6 illustrates the reflection from the interface between probe and probe aligning member as a function of wave number for some different probe aligning member configurations.

FIG. 6 schematically shows simulation results in the form of the reflection factor for the top of the probe aligning member 31 as a function of wave number ($=2\pi/\lambda$ which is 21 m$^{-1}$ at 1 GHz) for two different lengths $d_1$ of the substantially conical portion 33 and two different values of the maximum horizontal extension D of the probe aligning member 31 (in this case the diameter of the cylindrical portion 34).

For a typical conventional TDR-system, a frequency range corresponding to the wave number range 2-20 m$^{-1}$ is required. For an FMCW-type GWR system using a frequency range of about 1-2 GHz, the wave number range of about 21-42 m$^{-1}$ is required. The reflection factor 0.025 (or −36 dB) is marked as a possible maximum level for a custody transfer system. However, this reflection limit is only provided as an example. It should also be noted that other applications than custody transfer systems may have considerably less severe requirements on the maximum reflection factor at the interface between probe 7 and probe aligning member 31. For a 1-2 GHz system the length $d_1$=0.3 m may be sufficient to fulfil the severe requirements of a custody transfer system.

For a conventional TDR-system (with an approximate frequency range of 0.1-1 GHz), reflection will grow for low frequencies, but it is expected that a tapering portion 33 that is at least 0.6 m long should give acceptable performance.

It should be noted that several alternative configurations of the probe aligning member are feasible. Three such alternative configurations are schematically shown in FIG. 7, FIG. 8, and FIGS. 9a-b, respectively.

Figure 7:
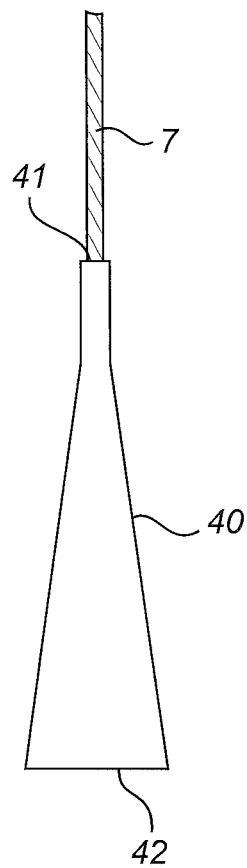
FIG. 7 schematically shows a first alternative configuration of the probe aligning member.

Referring first to FIG. 7, in a first alternative configuration, the probe aligning member 40 exhibits a gradually increasing horizontal extension all the way from top 41 to bottom 42.

Figure 8:
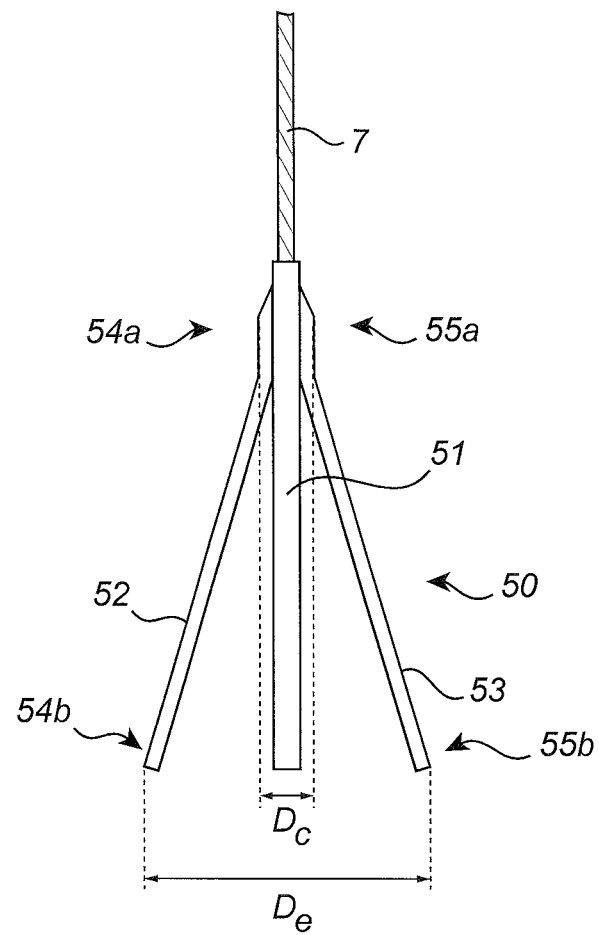
FIG. 8 schematically shows a second alternative configuration of the probe aligning member.

FIG. 8 schematically shows a second alternative configuration, in which the probe aligning member 50 comprises a central bar 51 and first 52 and second 53 flexible bars. A first bar end 54a of the first flexible bar 52, and a first bar end 55a of the second flexible bar 53 are attached to the central bar 51. In the expanded state, shown using solid lines in FIG. 8, the first flexible bar 52 extends from its first bar end 54a to its second bar end 54b in a first direction deviating from the vertical direction, and the second flexible bar 53 extends from its first bar end 55a to its second bar end 55b in a second direction also deviating from the vertical direction. In the expanded state, the horizontal extension of the probe aligning member 50 increases with increasing vertical distance from the first probe end to an expanded horizontal extension $D_e$.

The expanded horizontal extension $D_e$ provides for efficient impedance matching, but may be too large to allow insertion of the probe aligning member through an opening in the roof of the tank 4. Upon installation, the maximum horizontal extension of the probe aligning member 50 in FIG. 8 can therefore be reduced to a compressed horizontal extension $D_c$ by pressing the flexible bars 52, 53 towards the central bar 51. When pressure is released, the probe aligning member 50 springs back to the expanded state.

Finally, a third configuration of the probe aligning member will now be described with reference to FIGS. 9a-b.

Figures 9A, 9B:
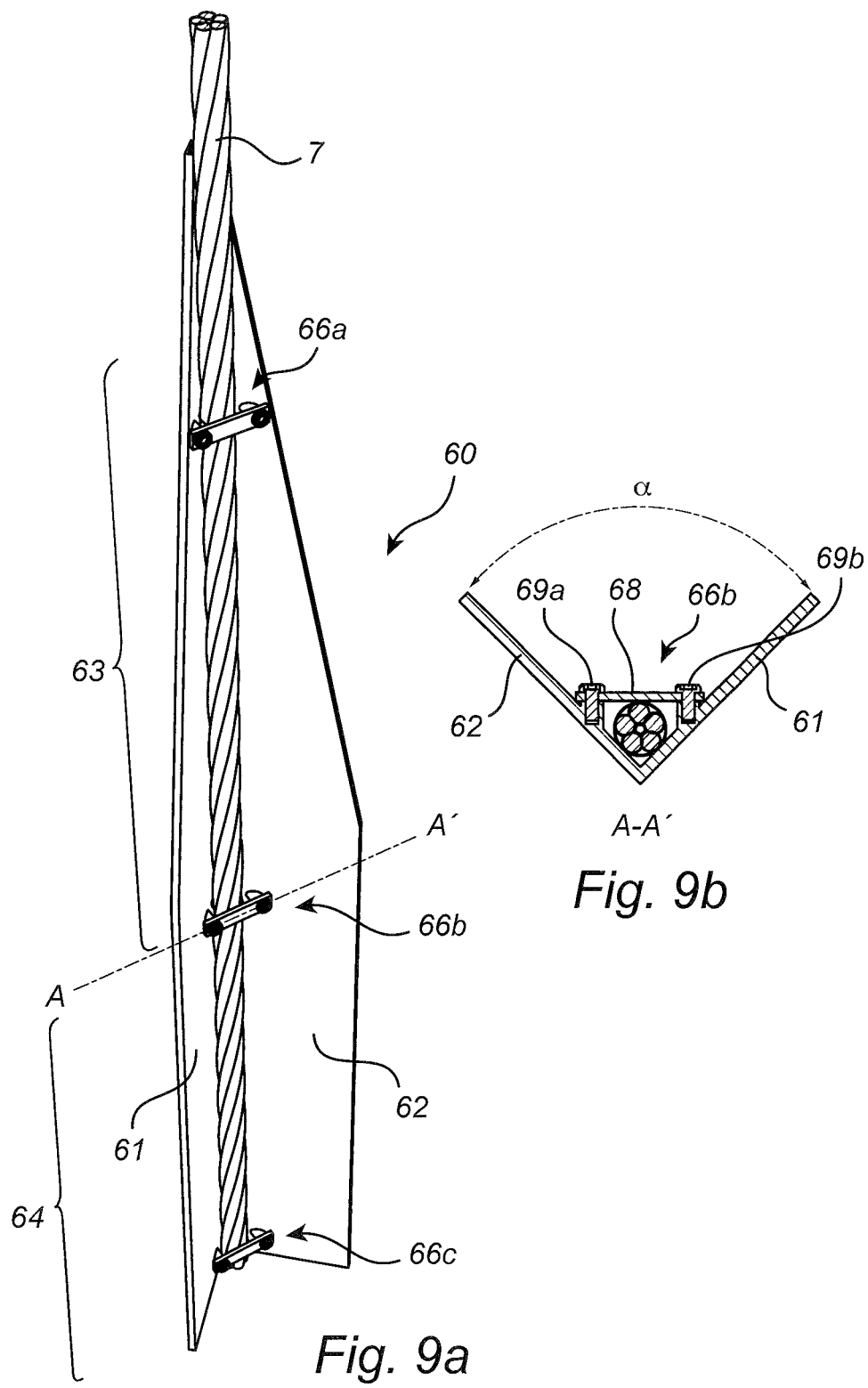
FIGS. 9a-b schematically show a third alternative configuration of the probe aligning member.

Referring first to FIG. 9a, the probe aligning member 60 comprises a conductive structure with first 61 and second 62 longitudinally extending substantially planar portions forming an angle α in respect of each other. The longitudinal portions are shaped such that the probe aligning member 60 exhibits a top portion 63 with a gradually increasing horizontal extension with increasing distance from the first end of the probe 7, and a bottom portion 64 with a substantially constant horizontal extension.

The probe aligning member 60 in FIGS. 9a-b further comprises a number of fasteners 66a-c. As is best shown in FIG. 9b, which is a cross-section view of the horizontal plane including the line A-A', each fastener comprises a plate 68 and two screws 69a-b for pressing the probe 7 between the plate 68 and the inner corner of the angle trim-like conductive structure of the probe aligning member 60 in FIGS. 9a-b.

The person skilled in the art realizes that the present invention by no means is limited to the preferred embodiments described above. On the contrary, many modifications and variations are possible within the scope of the appended claims.

What is claimed is:

1. A guided wave radar level gauge system, for determining a filling level of a product contained in a tank, said guided wave radar level gauge system comprising:
a transceiver for generating, transmitting and receiving electromagnetic signals within a predetermined frequency range having a center frequency;
a flexible single conductor probe having a first end connected to said transceiver and extending towards and into said product to a second end of the flexible single conductor probe for guiding an electromagnetic transmit signal from said transceiver through a tank atmosphere towards a surface of the product, and for returning an electromagnetic surface reflection signal resulting from reflection of said transmit signal at said surface back towards said transceiver;
a probe aligning member attached to said second end of the flexible single conductor probe for keeping the flexible single conductor probe substantially vertically extending from the first end to the second end,
said probe aligning member exhibiting a horizontal extension that increases with increasing distance from said first end of the flexible single conductor probe along a vertical distance greater than one half of a wavelength of said transmit signal at said center frequency; and
processing circuitry connected to said transceiver for determining said filling level based on said transmit signal and said surface reflection signal.

2. The guided wave radar level gauge system according to claim 1, wherein said probe aligning member exhibits a horizontal extension that increases with increasing distance from said first end of the flexible single conductor probe along a vertical distance greater than 10 cm.

3. The guided wave radar level gauge system according to claim 1, wherein said horizontal extension of the probe aligning member increases from a first horizontal extension substantially corresponding to a diameter of said flexible single conductor probe to a second horizontal extension being less than or equal to 5 cm to allow insertion of said probe aligning member through an opening at a top of the tank.

4. The guided wave radar level gauge system according to claim 1, wherein said probe aligning member has a mass being greater than half a total mass of said flexible single conductor probe.

5. The guided wave radar level gauge system according to claim 1, wherein said horizontal extension increases exponentially with increasing distance from said first end of the flexible single conductor probe.

6. The guided wave radar level gauge system according to claim 1, wherein said probe aligning member comprises a substantially conical portion.

7. The guided wave radar level gauge system according to claim 6, wherein said probe aligning member comprises a substantially cylindrical portion below said substantially conical portion.

8. The guided wave radar level gauge system according to claim 1, wherein said probe aligning member comprises:
a first portion exhibiting said horizontal extension that increases with increasing distance from said first end of the flexible single conductor probe along a vertical distance greater than one half of a wavelength of said transmit signal at said center frequency; and
a second portion, further away from said first end of the flexible single conductor probe than said first portion, exhibiting a substantially constant horizontal extension.

9. The guided wave radar level gauge system according to claim 1, wherein said probe aligning member comprises a vertically extending bore accommodating a portion of said flexible single conductor probe.

10. The guided wave radar level gauge system according to claim 1, wherein said probe aligning member comprises a conductive structure with first and second longitudinally extending substantially planar portions forming an angle with respect to each other, and at least one fixing structure pressing said flexible single conductor probe against the probe conductive structure inside the angle.

11. The guided wave radar level gauge system according to claim 1, wherein said probe aligning member comprises a plurality of flexible bars, each having a first bar end and a second bar end,
the first bar end of each of said flexible bars being connected to said flexible single conductor probe, and each of said bars, in an expanded state of said probe aligning member, extending from said first bar end in a direction deviating from the vertical direction to provide a tapered probe aligning member,
wherein at least one of said bars may be temporarily deflected to place said probe aligning member in a compressed state in which a maximum horizontal extension of said probe aligning member is reduced compared to said expanded state.

* * * * *